(12) United States Patent
Okuda (10) Patent No.: US 7,586,744 B2
(45) Date of Patent: Sep. 8, 2009

(54) DISPLAY AND PORTABLE DEVICE

(75) Inventor: Tatsumi Okuda, Motoshu (JP)

(73) Assignee: Epson Imaging Devices Corporation, Tokyo (JP)

(*) Notice: Subject to any disclaimer, the term of this patent is extended or adjusted under 35 U.S.C. 154(b) by 325 days.

(21) Appl. No.: 11/316,991

(22) Filed: Dec. 27, 2005

(65) Prior Publication Data

US 2006/0139271 A1    Jun. 29, 2006

(30) Foreign Application Priority Data

Dec. 28, 2004    (JP)    .............................. 2004-379021
Feb. 10, 2005    (JP)    .............................. 2005-34170

(51) Int. Cl.
G06F 1/16    (2006.01)
H05K 5/00    (2006.01)
H05K 7/00    (2006.01)

(52) U.S. Cl. .................... 361/679.56; 313/582; 349/58; 455/575.1; 361/679.21

(58) Field of Classification Search ................ 361/681, 361/679.21, 679.3, 679.55, 679.56; 349/58, 349/59, 65, 150, 152, 60; 455/575.1, 575.3, 455/575.4

See application file for complete search history.

(56) References Cited

U.S. PATENT DOCUMENTS

| 4,276,627 | A | * | 6/1981 | Komiyama | .................. 368/84 |
| 4,862,153 | A | * | 8/1989 | Nakatani et al. | .............. 349/58 |
| 5,264,992 | A | * | 11/1993 | Hogdahl et al. | .............. 361/681 |
| 5,442,470 | A | * | 8/1995 | Hashimoto | .................. 349/58 |
| 5,450,221 | A | * | 9/1995 | Owen et al. | .................. 349/58 |
| 5,710,607 | A | * | 1/1998 | Iwamoto et al. | ............. 349/150 |
| 5,986,726 | A | | 11/1999 | Murai | |
| 6,025,901 | A | * | 2/2000 | Adachi et al. | ............... 349/152 |
| 6,285,432 | B1 | * | 9/2001 | Phillips | ....................... 349/151 |
| 6,342,932 | B1 | * | 1/2002 | Terao et al. | .................... 349/58 |
| 6,504,587 | B1 | * | 1/2003 | Morishita et al. | ............. 349/58 |
| 6,549,263 | B1 | * | 4/2003 | Kim | ............................ 349/58 |
| 6,580,476 | B2 | * | 6/2003 | Hasegawa | ................... 361/681 |
| 6,654,232 | B1 | * | 11/2003 | Tsao et al. | ................... 361/681 |
| 6,697,130 | B2 | * | 2/2004 | Weindorf et al. | .............. 349/58 |
| 6,703,702 | B2 | * | 3/2004 | Inoue et al. | ................. 361/736 |
| 6,741,299 | B2 | * | 5/2004 | Fukayama et al. | .......... 361/681 |
| 6,768,636 | B2 | * | 7/2004 | Itoh | ........................... 361/681 |
| 6,777,621 | B2 | * | 8/2004 | Ishikawa et al. | ............ 349/150 |
| 6,816,213 | B2 | * | 11/2004 | Kato et al. | .................. 361/681 |

(Continued)

FOREIGN PATENT DOCUMENTS

JP    3-81727    4/1991

(Continued)

*Primary Examiner*—Jayprakash N Gandhi
*Assistant Examiner*—Adrian S Wilson
(74) *Attorney, Agent, or Firm*—McDermott Will & Emery LLP (57) ABSTRACT

A display capable of suppressing breakage of a display panel against an impact resulting from a fall or the like is obtained. This display comprises a display panel, an upper frame having a first opening for exposing a display surface of the display panel, a first flexible printed wiring board for the display panel having a first end connected to the display panel and a second end curvedly arranged on the lower side of the display panel, a reinforcing sheet arranged between the lower side of the display panel and the curvedly arranged first flexible printed wiring board and a lower frame engaging with the upper frame.

19 Claims, 8 Drawing Sheets

U.S. PATENT DOCUMENTS

| | | | |
|---|---|---|---|
| 6,867,825 B2 * | 3/2005 | Kanatsu et al. | 349/60 |
| 6,897,912 B2 * | 5/2005 | Kawakami et al. | 349/151 |
| 7,113,235 B2 * | 9/2006 | Tsukamoto | 349/58 |
| 7,113,237 B2 * | 9/2006 | Nitto et al. | 361/681 |
| 7,130,185 B2 * | 10/2006 | Chen et al. | 361/681 |
| 7,292,290 B2 * | 11/2007 | Miyagawa et al. | 361/681 |
| 7,298,433 B2 * | 11/2007 | You et al. | 361/681 |
| 2001/0003471 A1 * | 6/2001 | Lee et al. | 349/58 |
| 2001/0010569 A1 * | 8/2001 | Jin et al. | 349/58 |
| 2001/0017766 A1 * | 8/2001 | Murowaki et al. | 361/752 |
| 2004/0114062 A1 * | 6/2004 | Nishio et al. | 349/58 |
| 2005/0047067 A1 * | 3/2005 | Bang et al. | 361/681 |
| 2005/0062902 A1 * | 3/2005 | Fukayama | 349/58 |
| 2005/0088830 A1 * | 4/2005 | Yumoto et al. | 349/150 |
| 2005/0285991 A1 * | 12/2005 | Yamazaki | 349/58 |
| 2006/0055839 A1 * | 3/2006 | Hirao et al. | 349/58 |
| 2006/0114372 A1 * | 6/2006 | Saito et al. | 349/64 |
| 2006/0126300 A1 * | 6/2006 | Chang et al. | 361/704 |
| 2006/0164817 A1 * | 7/2006 | Yoshida | 361/749 |
| 2007/0291444 A1 * | 12/2007 | Kim | 361/681 |

FOREIGN PATENT DOCUMENTS

| | | |
|---|---|---|
| JP | 2001-166698 | 6/2001 |
| JP | 2001-174846 | 6/2001 |

* cited by examiner

DISPLAY AND PORTABLE DEVICE

BACKGROUND OF THE INVENTION

1. Field of the Invention

The present invention relates to a display and a portable device, and more particularly, it relates to a display and a portable device each comprising a display panel.

CROSS-REFERENCE TO RELATED APPLICATIONS

The priority applications Nos. JP2004-379021 and JP2005-034170 upon which this patent application is based is hereby incorporated by reference.

2. Description of the Background Art

A display comprising a display panel is known in general. For example, Japanese Patent Laying-Open No. 2001-174846 discloses a display (LCD (liquid crystal display) unit) comprising a display panel.

In the LCD unit disclosed in the aforementioned Japanese Patent Laying-Open No. 2001-174846, the display is held between an upper frame (shield case) and a lower frame (holding member). An end of an FPC (flexible printed circuit) is connected to the display panel, while another end of the FPC projects outward through a slit of the upper frame.

In the conventional LCD unit described in Japanese Patent Laying-Open No. 2001-174846, however, an impact applied to the upper and lower frames as a result of a fall or the like is disadvantageously transmitted to the display panel held therebetween. Consequently, the display panel may disadvantageously be broken due to the impact resulting from a fall or the like in the structure held between the upper and lower frames.

SUMMARY OF THE INVENTION

The present invention has been proposed in order to solve the aforementioned problem, and an object of the present invention is to provide a display and a portable device each capable of suppressing breakage of a display panel against an impact resulting from a fall or the like.

In order to attain the aforementioned object, a display according to a first aspect of the present invention comprises a display panel, an upper frame, arranged on the upper side of the display panel, having a first opening for exposing a display surface of the display panel, a first flexible printed wiring board for the display panel having a first end connected to the display panel and a second end curvedly arranged on the lower side of the display panel, a reinforcing sheet arranged between the lower side of the display panel and the curvedly arranged first flexible printed wiring board and a lower frame arranged on the lower side of the reinforcing sheet for engaging with the upper frame.

In the display according to the first aspect, as hereinabove described, the reinforcing sheet is arranged between the display panel and the curvedly arranged first flexible printed wiring board for dispersing an impact applied to the display as a result of a fall or the like before the impact is transmitted to the display panel, whereby breakage of the display panel can be suppressed. Also when the first flexible printed wiring board is pressed from the side of the lower frame, the reinforcing sheet disperses this pressing force before the same is transmitted to the display panel, whereby breakage of the display panel and various optical members can be suppressed.

In the aforementioned display according to the first aspect, the upper frame and the lower frame are preferably made of metal. According to this structure, the upper and lower frames of metal shield the first flexible printed wiring board, so that the display is resistant against noise or unnecessary electromagnetic wave radiation damaging an electronic device.

In the aforementioned display according to the first aspect, the reinforcing sheet is preferably made of metal. According to this structure, the strength of the reinforcing sheet can be easily increased. Consequently, breakage of the display panel can be easily suppressed also when an impact is applied thereto.

The aforementioned display according to the first aspect preferably further comprises a resin frame holding the side surfaces of the display panel, and the reinforcing sheet preferably includes a holding portion holding at least one edge of the resin frame. According to this structure, the resin frame held by the reinforcing sheet can be improved in mechanical strength. Thus, the resin frame can be inhibited from deformation also when an impact is applied to the display as a result of a fall or the like, whereby breakage of the display panel having the side surfaces held by the resin frame can be suppressed.

In the aforementioned structure having the reinforcing sheet provided with the holding portion, the holding portion of the reinforcing sheet is preferably U-shaped, and the U-shaped holding portion preferably holds at least one edge of the resin frame. According to this structure, one edge of the resin frame is fitted into the U-shaped holding portion, whereby the reinforcing sheet can reliably hold the resin frame. Thus, the resin frame can be inhibited from deformation also when an impact is applied to the display as a result of a fall or the like, whereby breakage of the display panel having the side surfaces held by the resin frame can be further suppressed. Also when a prescribed portion of the display panel generally constituted of two glass substrates is constituted of a single glass substrate in order to mount an electronic component for driving the display panel or the like on the display panel, for example, breakage of the portion of the single glass substrate (display panel) can be suppressed.

In the aforementioned structure having the reinforcing sheet provided with the holding portion, the display panel preferably includes two glass substrates, the first glass substrate preferably has a projection formed to project beyond the second glass substrate for connecting the first flexible printed wiring board, and the holding portion of the reinforcing sheet preferably holds one edge of the resin frame closer to the projection of the first glass substrate. According to this structure, the reinforcing sheet can reliably hold one edge of the resin frame closer to the projection of the first glass substrate, so that the resin frame can be inhibited from deformation also when an impact is applied to the display as a result of a fall or the like. Thus, breakage of the projection of the first glass substrate projecting beyond the second glass substrate can be suppressed.

In this case, an electronic component for driving the display panel is preferably mounted on the upper surface of the projection of the first glass substrate. Breakage of the display panel can be suppressed against an impact resulting from a fall or the like also when the display panel is a COG (chip on glass) type display panel formed by mounting an electronic component on a projection of a glass substrate.

In the aforementioned display according to the first aspect, a connector portion for electrically connecting with an external device is preferably mounted on the first flexible printed wiring board, and a second opening is preferably provided in the lower frame on a position corresponding to the connector portion of the curvedly arranged first flexible printed wiring board. According to this structure, the display can be easily electrically connected with the external device through the connector portion of the first flexible printed wiring board. Also when the display is strongly pressed against the external device to press the connector portion of the first flexible printed wiring board in order to connect this connector portion of the first flexible printed wiring board with a connector portion of the external device for building the display into the external device, therefore, the reinforcing sheet supporting the connector portion can disperse the pressing force acting on the connector portion. Consequently, breakage of the display panel resulting from strong pressing force acting on the connector portion can be suppressed when the display is connected with the external device.

In the aforementioned display according to the first aspect, a first engaging portion is preferably provided on the lower surface of the reinforcing sheet, and a second engaging portion engaging with the first engaging portion of the reinforcing sheet is preferably provided on the first flexible printed wiring board. According to this structure, the first flexible printed wiring board can be easily and reliably registered by engaging the first and second engaging portions with each other, whereby assembling workability of the display can be improved.

The aforementioned display according to the first aspect preferably further comprises a resin frame holding the side surfaces of the display panel, while a third engaging portion is preferably provided on the inner side surface of the reinforcing sheet, and a fourth engaging portion engaging with the third engaging portion is preferably provided on the outer side surface of the resin frame. According to this structure, the rein frame holding the side surfaces of the display panel and the reinforcing sheet can be easily and reliably engaged with each other by engaging the third and fourth engaging portions with each other. Consequently, the reinforcing sheet dispersing an impact applied to the display as a result of a fall or the like can be reliably engaged with the resin frame, and assembling workability of the display comprising this reinforcing sheet can be improved.

The aforementioned display according to the first aspect preferably further comprises a light source for irradiating light toward the display panel and a second flexible printed wiring board for the light source connected to the light source, while the reinforcing sheet preferably includes a receiving portion receiving the second flexible printed wiring board and a suppressing portion suppressing displacement when curving the second flexible printed wiring board. According to this structure, the receiving portion and the suppressing portion of the reinforcing sheet come into contact with the second flexible printed wiring board, whereby a curved portion of the second flexible printed wiring board can be inhibited from displacement to its original position. Thus, a mounting angle of the light source connected to the second flexible printed wiring board can be inhibited from deviation resulting from displacement of the second flexible printed wiring board when the second flexible printed wiring board is curved on the lower side of the display panel.

The aforementioned display comprising the reinforcing sheet including the suppressing portion preferably further comprises a resin frame holding the side surfaces of the display panel, while the reinforcing sheet preferably includes a holding portion holding at least one edge of the resin frame, and the holding portion preferably functions also as the suppressing portion. According to this structure, it is possible to inhibit the second flexible printed wiring board from displacement while holding one edge of the resin frame.

In the aforementioned display comprising the reinforcing sheet including the suppressing portion, the second flexible printed wiring board preferably includes a slender long section curved to be connected to the curvedly arranged first flexible printed wiring board. Also when the display is provided with the slender long section curved to be connected to the first flexible printed wiring board, it is possible to inhibit the mounting angle of the light source connected to the second flexible printed wiring board from deviation resulting from displacement of the long section.

In this case, the display preferably further comprises a resin frame holding the side surfaces of the display panel, and the resin frame preferably has a groove portion for receiving the long section of the second flexible printed wiring board. According to this structure, the long section can be arranged along the groove portion of the resin frame, whereby the second flexible printed wiring board can be easily inhibited from misregistration. Further, the long section and the first flexible printed wiring board connected to the long section can be easily registered with each other by curving the long section arranged along the groove portion. Consequently, assembling workability of the display can be improved.

In the aforementioned structure comprising the reinforcing sheet having the U-shaped holding portion, the U-shaped holding portion of the reinforcing sheet preferably holds one edge of the resin frame having a width exceeding the width of the display panel. According to this structure, the U-shaped holding portion of the reinforcing sheet can more reliably hold one edge of the resin frame having the width exceeding the width of the display panel. Consequently, the resin frame can be inhibited from deformation also when torsional force deflecting the resin frame is applied to the display following application of an impact resulting from a fall or the like, whereby breakage of the display panel can be suppressed.

In the aforementioned structure comprising the reinforcing sheet having the U-shaped holding portion, the width of the U-shaped holding portion of the reinforcing sheet is preferably smaller than the width of the display panel. Also when formed with the holding portion having the width smaller than that of the display panel, the reinforcing sheet can hold the resin frame by receiving one edge of the resin frame in the U-shaped holding portion.

In the aforementioned structure comprising the reinforcing sheet having the U-shaped holding portion, the U-shaped holding portion of the reinforcing sheet preferably includes a reinforcing portion having a folded forward end on an edge along one edge of the resin frame. According to this structure, the reinforcing portion increases the mechanical strength of the holding portion, whereby the holding portion can be inhibited from deformation also when a strong impact is applied to the display as a result of a fall or the like. Thus, the holding portion can more reliably hold one edge of the resin frame, whereby breakage of the resin frame holding the side surfaces of the display panel can be suppressed. Consequently, breakage of the display panel can be further suppressed.

In this case, the display preferably further comprises a light source for irradiating light toward the display panel and a second flexible printed wiring board for the light source connected to the light source, and a reinforcing portion of the holding portion preferably holds a portion of the second flexible printed wiring board along the reinforcing portion of the holding portion of the reinforcing sheet. According to this structure, the second flexible printed wiring board can be entirely held so that the light source connected to the second flexible printed wiring board can be reliably arranged on a prescribed position. Consequently, leakage of light from the light source arranged on the prescribed position can be suppressed so that the light source can efficiently supply light, whereby the display panel can ensure stable brightness.

A display according to a second aspect of the present invention comprises a display panel, a resin frame holding the side surfaces of the display panel, a first flexible printed wiring board for the display panel having a first end connected to the display panel and a second end curvedly arranged on the lower side of the display panel, a reinforcing sheet, arranged between the lower side of the display panel and the curvedly arranged first flexible printed wiring board, including a holding portion holding at least one edge of the resin frame and a lower frame arranged on the lower side of the reinforcing sheet for storing the display panel by engaging with the resin frame.

In the display according to the second aspect, as hereinabove described, the reinforcing sheet is arranged between the display panel and the curvedly arranged first flexible printed wiring board for dispersing an impact applied to the display as a result of a fall or the like before the impact is transmitted to the display panel, whereby breakage of the display panel can be suppressed. Also when the first flexible printed wiring board is pressed from the side of the lower frame, the reinforcing sheet disperses this pressing force before the same is transmitted to the display panel, whereby breakage of the display panel and various optical members can be suppressed.

In the aforementioned display according to the second aspect, the holding portion of the reinforcing sheet is preferably U-shaped, and the U-shaped holding portion preferably holds at least one edge of the resin frame. According to this structure, one edge of the resin frame is fitted into the U-shaped holding portion, whereby the reinforcing sheet can reliably hold the resin frame. Thus, the resin frame can be inhibited from deformation also when an impact is applied to the display as a result of a fall or the like, whereby breakage of the display panel having the side surfaces held by the resin frame can be further suppressed. Also when a prescribed portion of the display panel generally constituted of two glass substrates is constituted of a single glass substrate in order to mount an electronic component for driving the display panel or the like on the display panel, for example, breakage of the portion of the single glass substrate (display panel) can be suppressed.

A portable device according to a third aspect of the present invention includes a display comprising a display panel, an upper frame, arranged on the upper side of the display panel, having a first opening for exposing a display surface of the display panel, a first flexible printed wiring board for the display panel having a first end connected to the display panel and a second end curvedly arranged on the lower side of the display panel, a reinforcing sheet arranged between the lower side of the display panel and the curvedly arranged first flexible printed wiring board and a lower frame arranged on the lower side of the reinforcing sheet for engaging with the upper frame.

In the portable device according to the third aspect, as hereinabove described, the reinforcing sheet is arranged between the display panel and the curvedly arranged first flexible printed wiring board so that the portable device including the display can suppress breakage of the display panel against an impact resulting from a fall or the like.

A portable device according to a fourth aspect of the present invention includes a display comprising a display panel, a resin frame holding the side surfaces of the display panel, a first flexible printed wiring board for the display panel having a first end connected to the display panel and a second end curvedly arranged on the lower side of the display panel, a reinforcing sheet, arranged between the lower side of the display panel and the curvedly arranged first flexible printed wiring board, including a holding portion holding at least one edge of the resin frame and a lower frame arranged on the lower side of the reinforcing sheet for storing the display panel by engaging with the resin frame.

In the portable device according to the fourth aspect, as hereinabove described, the reinforcing sheet is arranged between the display panel and the curvedly arranged first flexible printed wiring board so that the portable device including the display can suppress breakage of the display panel against an impact resulting from a fall or the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Referring to FIGS. 1 to 6, the present invention is applied to an LCD unit 100, which is an exemplary display, according to this embodiment.

Figure 1:
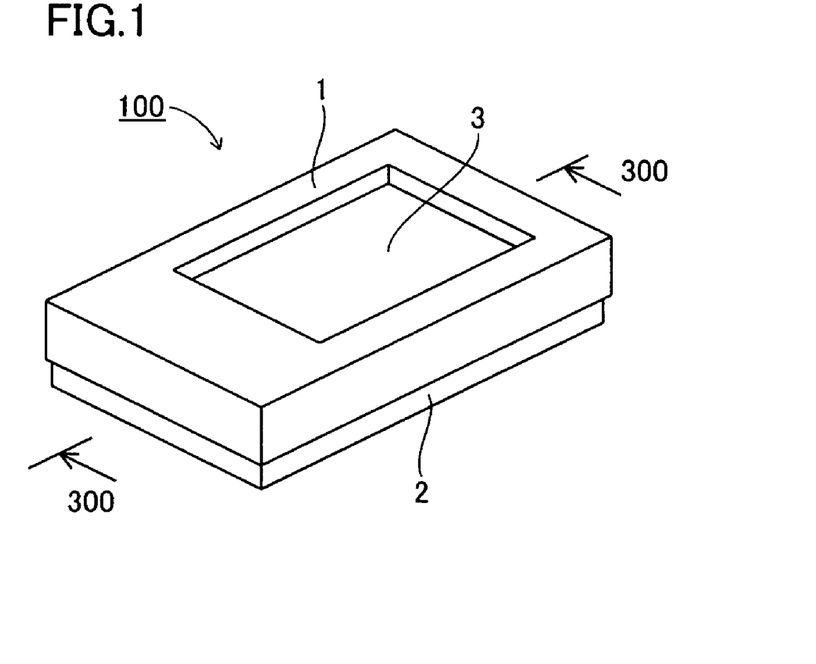
FIG. 1 is a perspective view showing an LCD unit according to an embodiment of the present invention.
Figure 2:
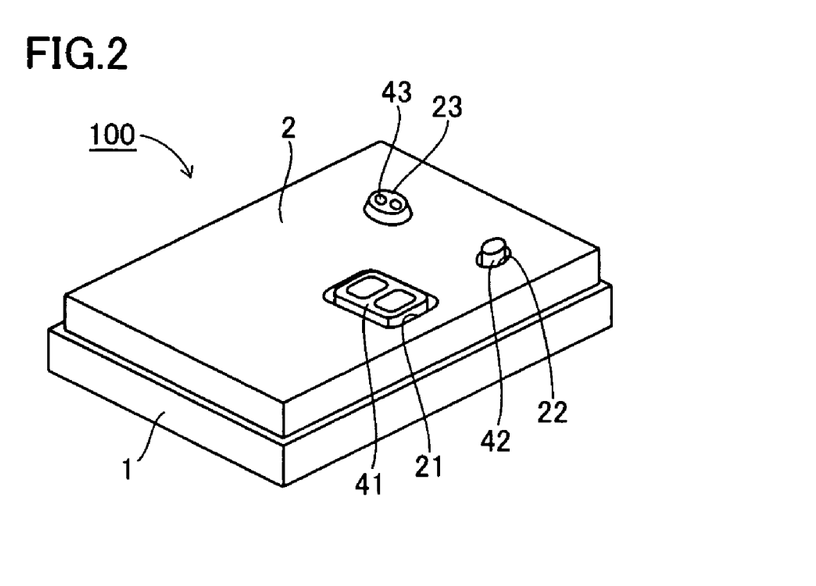
FIG. 2 is a perspective view showing the bottom side of the LCD unit according to the first embodiment shown in FIG. 1.

The LCD unit 100 according to the embodiment of the present invention comprises upper and lower frames 1 and 2 of metal and a liquid crystal display panel 3 stored inside the upper and lower frames 1 and 2, as shown in FIGS. 1 and 2.

The liquid crystal display panel 3 is an example of the "display panel" in the present invention.

As shown in FIG. 2, a connector portion 41 and an antenna characteristic checking pin connector portion (hereinafter referred to as "pin connector portion") 42 mounted on a flexible printed wiring board (hereinafter referred to as "panel FPC") 4 for the display panel 3 described later are arranged on positions corresponding to openings 21 and 22 of the lower frame 2 respectively. In other words, the connector portion 41 and the pin connector portion 42 are arranged to be externally connectable through the openings 21 and 22 respectively.

Figure 3:
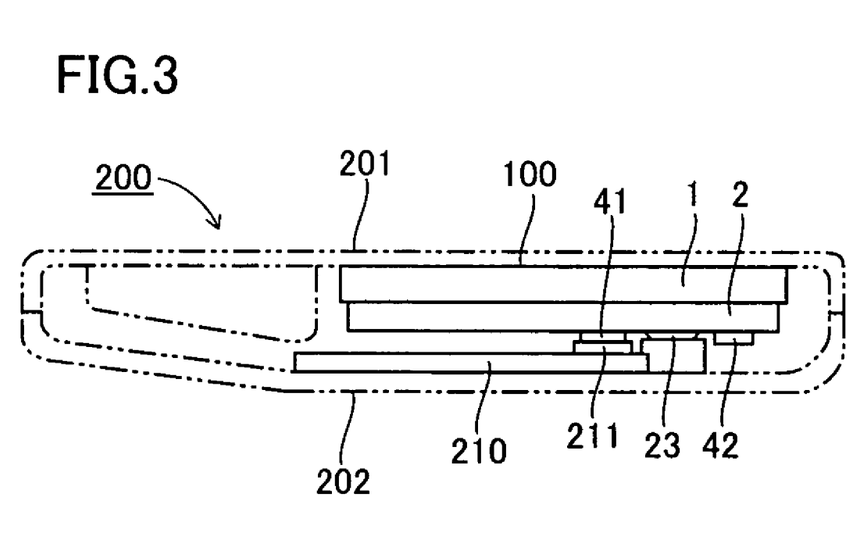
FIG. 3 is an internal perspective view showing the LCD unit according to the first embodiment shown in FIG. 1 in a state mounted on a printed wiring board of a potable telephone.

As shown in FIG. 3, the LCD unit 100 is stored inside upper and lower chassis 201 and 202 of a portable telephone 200. The connector portion 41 (see FIG. 2) of the panel FPC 4 of the LCD unit 100 is connected to a connector portion 211 set on a printed wiring board 210 of the portable telephone 200.

Figure 4:
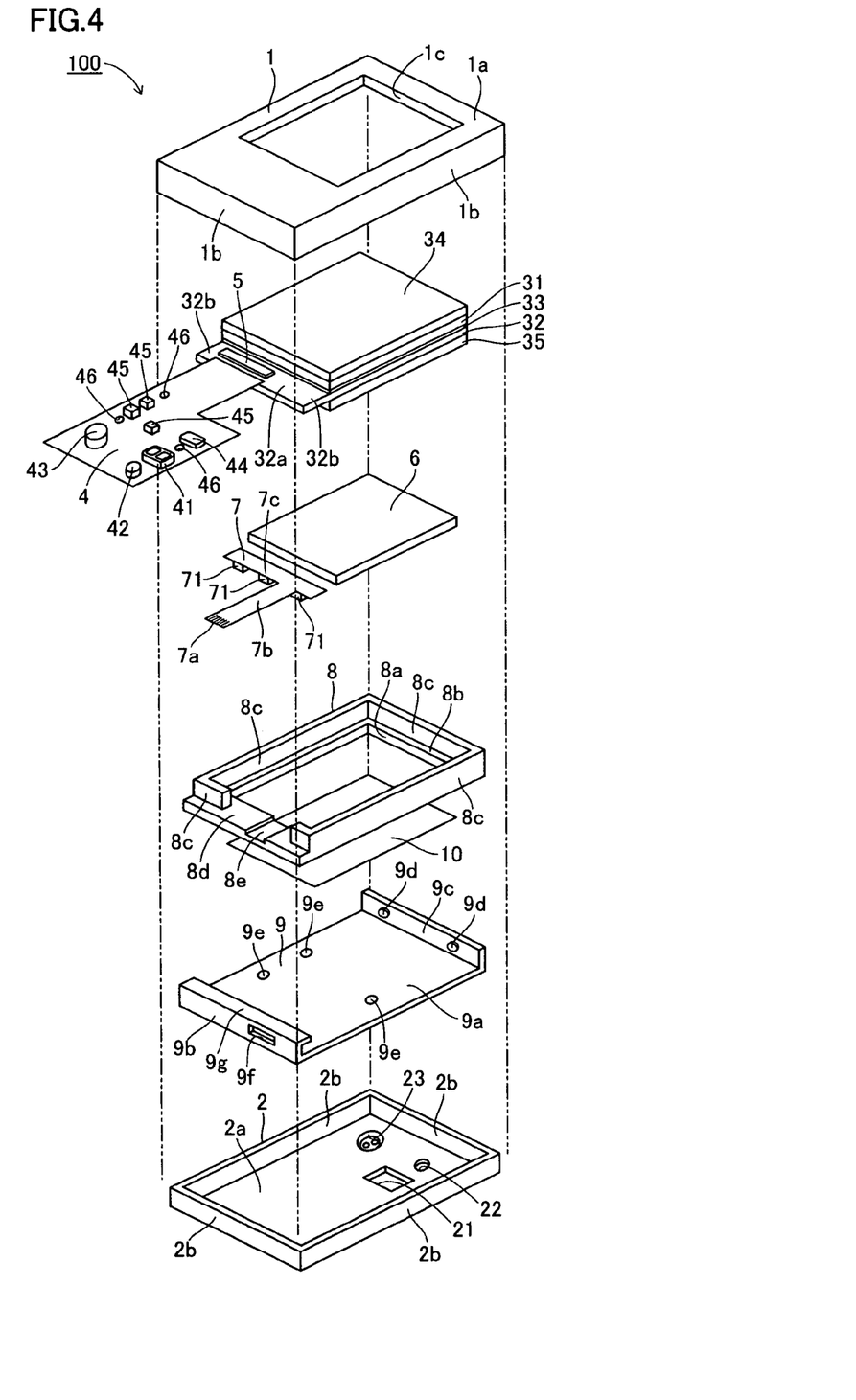
FIG. 4 is an exploded perspective view of the LCD unit according to the embodiment shown in FIG. 1.
Figure 5:
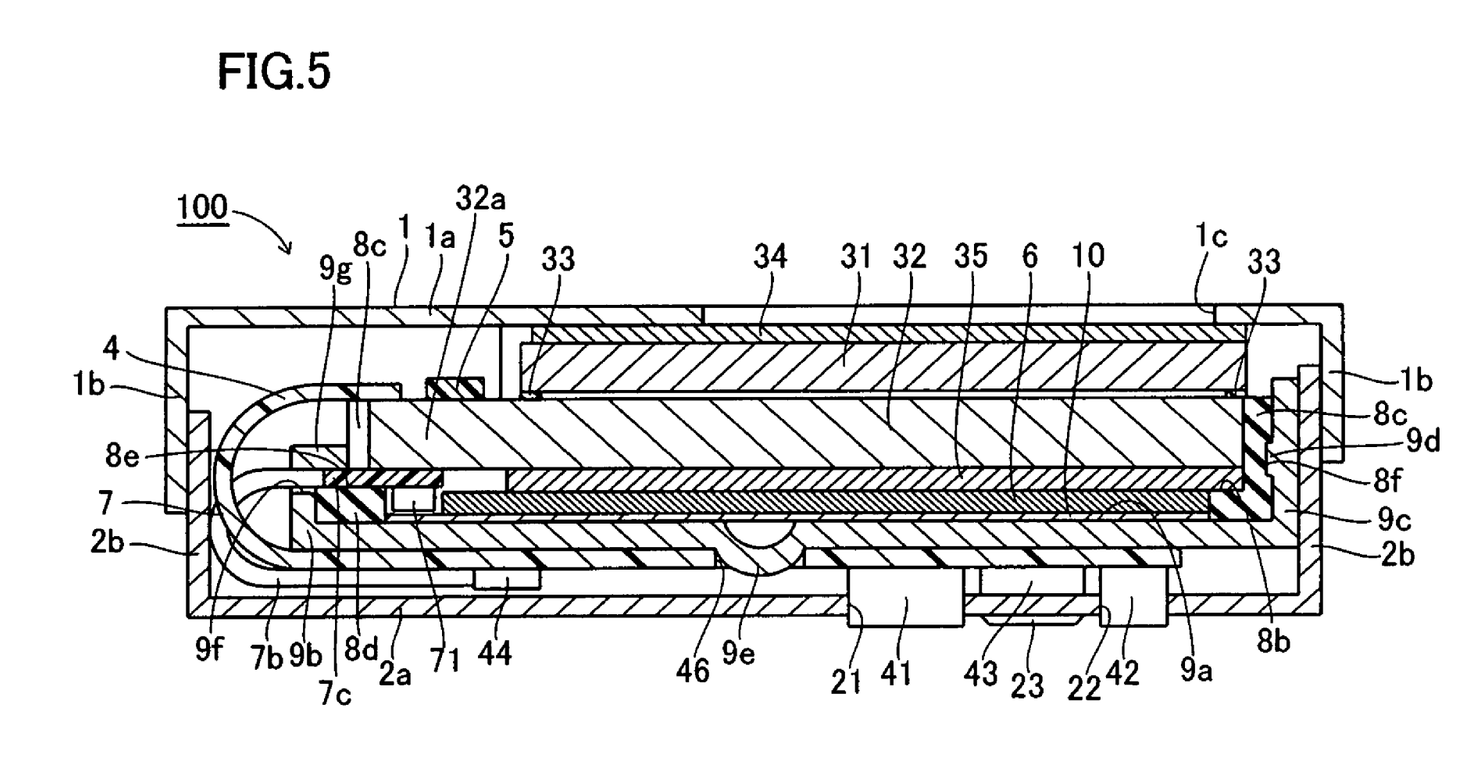
FIG. 5 is a sectional view taken along the line 300-300 in FIG. 1.

As shown in FIGS. 4 and 5, the upper frame 1 is arranged on the upper side of the liquid crystal display panel 3. This upper frame 1 includes a planar portion 1a, four side portions 1b downwardly extending from four edges of the planar portion 1a and an opening 1c for exposing a display surface of the liquid crystal display panel 3. The opening 1c of the upper frame 1 is an example of the "first opening" in the present invention. The lower frame 2 includes a bottom portion 2a and four side portions 2b upwardly extending from four edges of the bottom portion 2a. The side portions 1b and 2b of the upper and lower frames 1 and 2 are provided with irregular portions (not shown), for engaging the upper and lower frames 1 and 2 with each other through the irregular portions. The bottom portion 2a of the lower frame 2 is formed with the openings 21 and 22 on the positions where the connector portion 41 and the pin connector portion 42 mounted on the aforementioned panel FPC 4 are arranged respectively. The opening 21 of the lower frame 2 is an example of the "second opening" in the present invention.

The liquid crystal display panel 3 includes upper and lower glass substrates 31 and 32 oppositely arranged to hold liquid crystals (not shown) therebetween and a sealing member 33 arranged between the glass substrates 31 and 32. A thin-film transistor (TFT: not shown) is formed on the lower glass substrate 32. An upper polarizing plate 34 is arranged on the upper side of the glass substrate 31, while a lower polarizing plate 35 is arranged on the lower side of the glass substrate 32.

Figure 6:
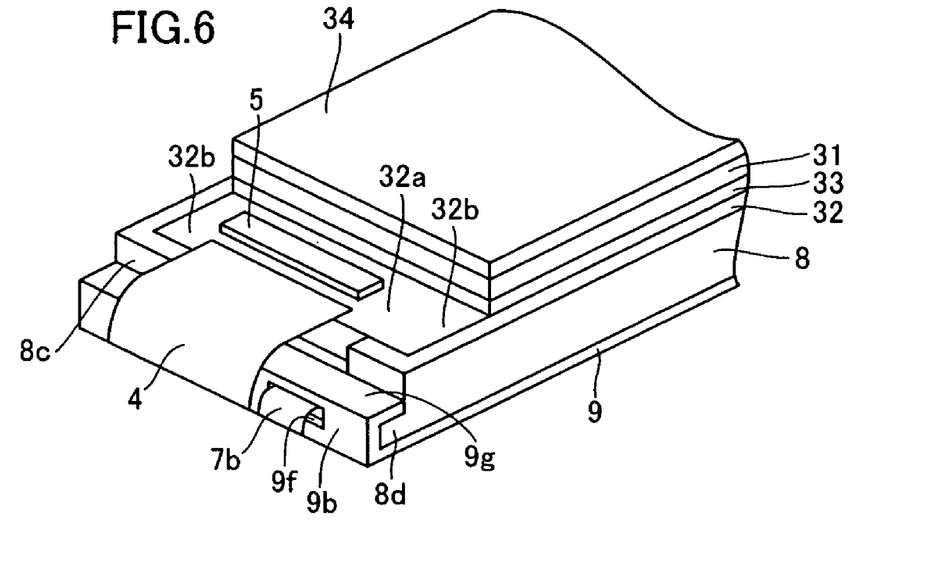
FIG. 6 is a perspective view showing a display panel, a resin frame and a reinforcing sheet of the LCD unit according to the embodiment shown in FIG. 1.

As shown in FIGS. 4 to 6, the lower glass substrate 32 is formed with a projection 32a projecting beyond the upper glass substrate 31. A driver IC (integrated circuit) 5 for driving the liquid crystal display panel 3 and an end of the panel FPC 4 are mounted on the upper surface of the projection 32a of the lower glass substrate 32. The panel FPC 4 is electrically connected to the driver IC 5. The driver IC 5 is an example of the "electronic component" in the present invention, and the panel FPC 4 is an example of the "first flexible printed wiring board" in the present invention. It is known that left and right ends 32b of the projection 32a are particularly easily cracked due to an impact resulting from a fall or the like.

As shown in FIGS. 4 and 5, the connector portion 41 connected to the connector portion 211 (see FIG. 3) of the printed wiring board 210 of the aforementioned portable telephone 200, the pin connector portion 42, a speaker 43, another connector portion 44 connected with a connector plug portion 7a of a flexible printed wiring board 7 for a backlight described later and a plurality of electronic components 45 are mounted on the panel FPC 4. The panel FPC 4 is further provided with three locating holes 46 engaging with three projecting portions 9e provided on a reinforcing sheet 9 described later. The locating holes 46 are examples of the "second engaging portion" in the present invention. The panel FPC 4 is curved on the lower side of the liquid crystal display panel 3 and arranged between the lower frame 2 and the reinforcing sheet 9.

The flexible printed wiring board (hereinafter referred to as "backlight FPC") 7 for a backlight is arranged on the lower side of the projection 32a of the lower glass substrate 32. The backlight FPC 7 is an example of the "second flexible printed wiring board" in the present invention. Four LEDs 71 for irradiating light toward a light guide 6 are mounted on the bottom surface of the backlight FPC 7. These LEDs 71 are mounted on the backlight FPC 7 to irradiate light toward the light guide 6. The LEDs 71 are examples of the "light source" in the present invention. The backlight FPC 7 is provided with a slender long section 7b having the connector plug portion 7a on its forward end to be connected with the connector portion 44 of the panel FPC 4. The long section 7b outwardly extends from an end 7c (see FIG. 5) of a portion on which the LEDs 71 are mounted. This long section 7b is curvedly arranged on the lower side of the panel FPC 4, to be connected with the connector portion 44 of the panel FPC 4 arranged on the lower side of the reinforcing sheet 9.

A resin frame 8 is provided for storing the liquid crystal display panel 3, the light guide 6 and the backlight FPC 7. This resin frame 8 includes an opening 8a for storing the light guide 6, a bottom portion 8b forming the opening 8a, four side portions 8c upwardly extending from four edges of the bottom portion 8b and a projection 8d projecting toward the projection 32a of the lower glass substrate 32 of the liquid crystal display panel 3. These four side portions 8c hold the side surfaces of the liquid crystal display panel 3. The projection 8d receives a U-shaped holding portion 9b of the reinforcing sheet 9 described later. The projection 8d is formed with a groove portion 8e for receiving the long section 7b of the backlight FPC 7. Recess portions 8f (see FIG. 5) are formed on the outer side of the side portion 8c opposed to the projection 8d for engaging with projecting engaging portions 9d of the reinforcing sheet 9 described later. The recess portions 8f are examples of the "fourth engaging portion" in the present invention. A reflective sheet 10 is arranged on the lower side of the resin frame 8 for reflecting light irradiated from the LEDs 71 upward (toward the liquid crystal display panel 3). This reflective sheet 10 is arranged on a position blocking the opening 8a of the resin frame 8.

According to this embodiment, the reinforcing sheet 9 of a metallic plate is arranged between the lower frame 2 and the resin frame 8. This reinforcing sheet 9 is provided with a bottom portion 9a, the U-shaped holding portion 9b engaging with the projection 8d of the resin frame 8 and a side portion 9c upwardly extending from an edge of the bottom portion 9a opposite to the holding portion 9b. The projecting engaging portions 9d are formed on the inner side of the side portion 9c for engaging with the recess portions 8f (see FIG. 5) of the resin frame 8. The three projecting portions 9e downwardly projecting from the bottom portion 9a are formed on the bottom portion 9a for engaging with the locating holes 46 of the panel FPC 4. The projecting portions 9e are examples of the "first engaging portion" in the present invention, and the engaging portions 9d are examples of the "third engaging portion" in the present invention.

According to this embodiment, the holding portion 9b holds the projection 8d of the resin frame 8 having a width exceeding the width of the liquid crystal display panel 3. The holding portion 9b is provided with a receiving portion 9f receiving the long section 7b of the backlight FPC 7 and an upper planar portion 9g of the U-shaped holding portion 9b. When the long section 7b of the backlight FPC 7 is curved on the lower side of the reinforcing sheet 9, the receiving portion 9f and the planar portion 9g come into contact with the long section 7b from above to inhibit the long section 7b from displacement (lifting), whereby the mounting angle of the LED 71 can be inhibited from deviation following displacement of the long section 7b. The planar portion 9g of the holding portion 9b is an example of the "suppressing portion" in the present invention.

According to this embodiment, as hereinabove described, the reinforcing sheet 9 is arranged between the liquid crystal display panel 3 and the curvedly arranged panel FPC 4 for dispersing an impact applied to the LCD unit 100 as a result of a fall or the like before the same is transmitted to the liquid crystal display panel 3, whereby breakage of the liquid crystal display panel 3 can be suppressed. Also when the panel FPC 4 is pressed from the side of the lower frame 2, the reinforcing sheet 9 disperses this pressing force before the same is transmitted to the liquid crystal display panel 3, whereby breakage of the liquid crystal display panel 3 and various optical members can be suppressed.

According to this embodiment, the metal reinforcing sheet 9 is arranged between the liquid crystal display panel 3 and the panel FPC 4 to disperse repulsive force also when the speaker 43 is pressed against the bottom portion 2a of the lower frame 2 in order to suppress air leakage, whereby breakage of the optical members such as the light guide 6 and the reflective sheet 10 can be suppressed. Therefore, the speaker 43 mounted on the panel FPC 4 can be arranged in a state suppressing air leakage.

According to this embodiment, the reinforcing sheet 9 constituted of a metallic plate can be easily increased in strength. Consequently, breakage of the liquid crystal display panel 3 can be easily suppressed also when an impact is applied thereto.

According to this embodiment, the holding portion 9b of the reinforcing sheet 9 is formed in the U-shaped manner for holding the projection 8d of the resin frame 8 so that the projection 8d of the resin frame 8 is fitted into the holding portion 9b, whereby the reinforcing sheet 9 can reliably hold the resin frame 8. Thus, the resin frame 8 can be inhibited from deformation also when an impact is applied to the LCD unit 100 as a result of a fall or the like, whereby breakage of the liquid crystal display panel 3 having the side surfaces held by the resin frame 8 can be further suppressed.

According to this embodiment, the holding portion 9b of the reinforcing sheet 9 holds the projection 8d of the resin frame 8 close to the projection 32a of the lower glass substrate 32 so that the reinforcing sheet 9 can reliably hold the projection 8d of the resin frame 8 close to the projection 32a of the glass substrate 32, whereby breakage of the projection 32a of the glass substrate 32 and the left and right ends 32b thereof can be suppressed also when an impact is applied to the LCD unit 100 as a result of a fall or the like.

According to this embodiment, the opening 21 is provided on the position of the lower frame 2 corresponding to the connector portion 41 of the curved panel FPC 4 so that the panel FPC 4 can be easily electrically connected with the printed wiring board 210 of the portable telephone 200 through the connector portion 41 thereof. Also when the LCD unit 100 is strongly pressed against the portable telephone 200 in order to connect the connector portion 41 of the panel FPC 4 with the connector portion 211 set on the printed wiring board 210 of the portable telephone 200 at this time, the reinforcing sheet 9 supporting the connector portion 41 can disperse the pressing force applied to the connector portion 41. Consequently, breakage of the liquid crystal display panel 3 resulting from strong pressing force applied to the connector portion 41 for connecting the same with the portable telephone 200 can be suppressed.

According to this embodiment, the reinforcing sheet 9 is provided with the projecting portions 9e while the panel FPC 4 is provided with the locating holes 46 engaging with the projecting portions 9e of the reinforcing sheet 9 so that the components such as the connector portion 41, the pin connector portion 42 and the speaker 43 mounted on the panel FPC 4 can be easily and reliably arranged on prescribed positions by engaging the projecting portions 9e of the reinforcing sheet 9 and the locating holes 46 of the panel FPC 4 with each other, whereby assembling workability of the LCD unit 100 can be improved.

According to this embodiment, the upper and lower frames 1 and 2 of metal are so employed as to shield the panel FPC 4 and the liquid crystal display panel 3 with the metal upper and lower frames 1 and 2, whereby the display is resistant against noise or unnecessary electromagnetic wave radiation damaging an electronic device.

Although the present invention has been described and illustrated in detail, it is clearly understood that the same is by way of illustration and example only and is not to be taken by way of limitation, the spirit and scope of the present invention being limited only by the terms of the appended claims.

Figure 7:
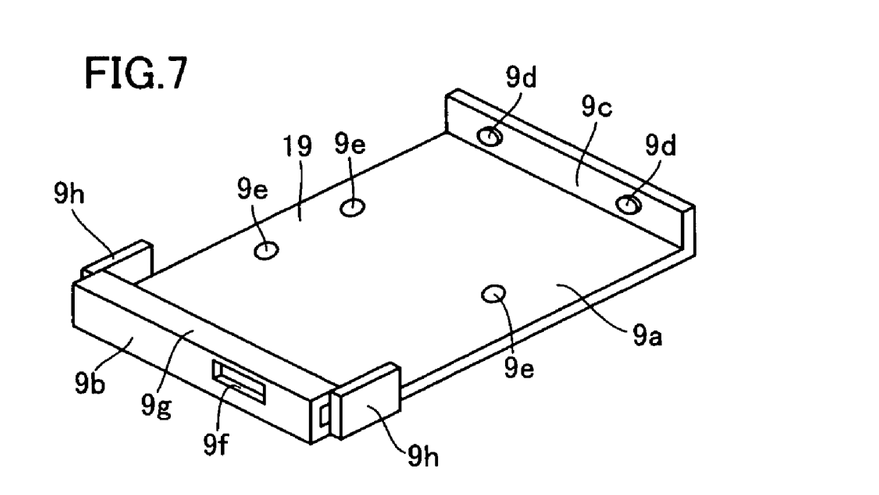
FIG. 7 is a perspective view of a reinforcing sheet according to a first modification of the LCD unit according to the embodiment shown in FIG. 1.

For example, while the reinforcing sheet 9 holds two edges of the resin frame 8 with the holding portion 9b engaging with the projection 8d of the resin frame 8 and the side portion 9c formed with the projecting engaging portions 9d engaging with the recess portions 8f of the side portion 8c upwardly extending from the edge opposite to the projection 8d in the aforementioned embodiment, the present invention is not restricted to this but a reinforcing sheet 19 may alternatively be integrally formed with side holding portions 9h for holding the side surfaces of the liquid crystal display panel 3, as in a first modification shown in FIG. 7. Thus, the reinforcing sheet 19, enabled to hold four edges of the liquid crystal display panel 3, can reliably hold the liquid crystal display panel 3.

Figure 8:
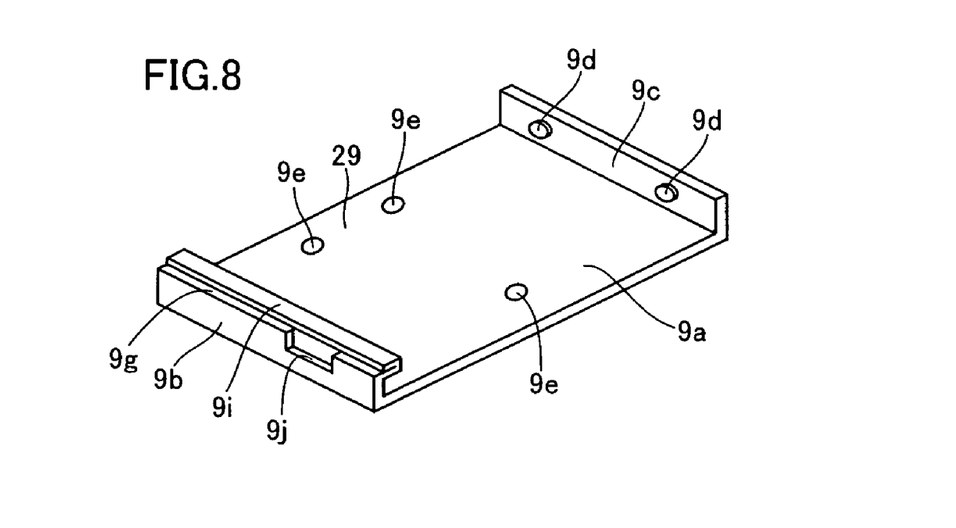
FIG. 8 is a perspective view of a reinforcing sheet according to a second modification of the LCD unit according to the embodiment shown in FIG. 1.

While the reinforcing sheet 9 includes the U-shaped holding portion 9b in the aforementioned embodiment, the present invention is not restricted to this but a reinforcing sheet 29 may alternatively have a folded portion 9i formed by folding the long side of an end of a planar portion 9b of a U-shaped holding portion 9b by a length of about several millimeters at an angle of 180°, as in a second modification shown in FIG. 8. Thus, the mechanical strength of the holding portion 9b is so improved that the holding portion 9b formed with the folded portion 9i and improved in mechanical strength can be inhibited from deformation also when a strong impact is applied to the LCD unit 100 as a result of a fall or the like, whereby the holding portion 9b can more reliably hold the projection 8d of the resin frame 8. Thus, breakage of the liquid crystal display panel 3 can be further suppressed. In particular, breakage of the projection 32a, provided on the lower glass substrate 32 to project beyond the upper glass substrate 31 in order to mount the driver IC 5 for driving the liquid crystal display panel 3 according this embodiment, can be suppressed. The folded portion 9i is an example of the "reinforcing portion" in the present invention.

Figure 9:
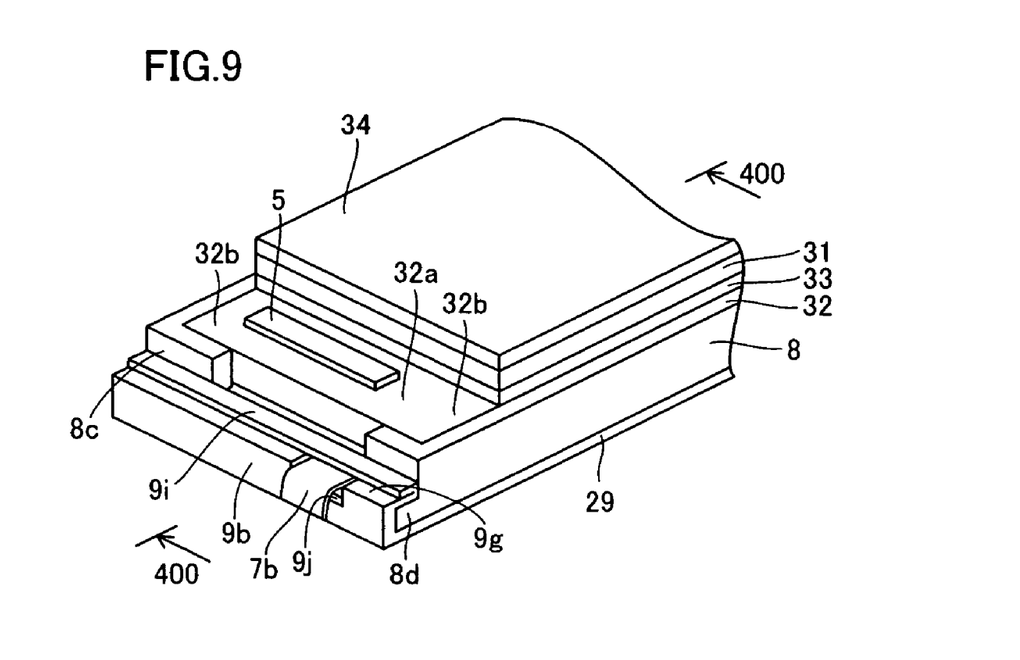
FIG. 9 is a diagram for illustrating the detailed structure of an LCD unit according to the second modification of the LCD unit according to the embodiment shown in FIG. 1.
Figure 10:
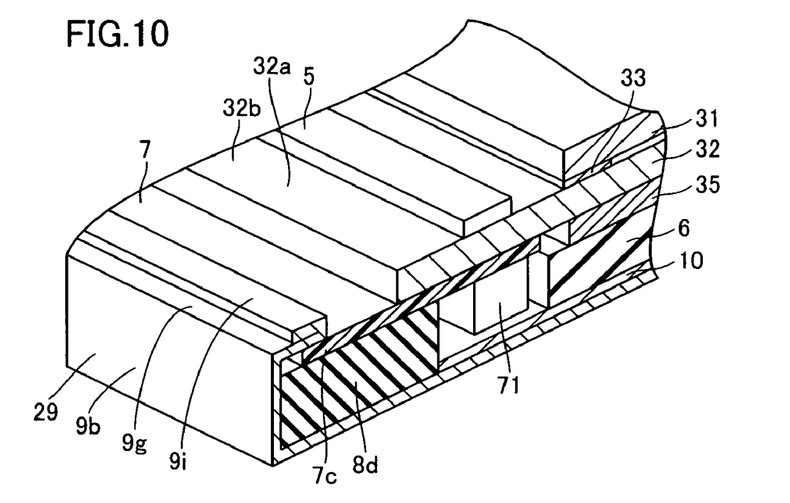
FIG. 10 is a sectional view taken along the line 400-400 in FIG. 9.

According to the aforementioned second modification, the long section 7b of the backlight FPC 7 outwardly extends from the end 7c, as shown in FIGS. 9 and 10. This long section 7b is inserted into an opening 9j formed on the reinforcing sheet 29, so that the side closer to the connector plug portion 7a is outwardly exposed. At this time, the end 7c of the backlight FPC 7 is held between the planar portion 9g formed with the folded portion 9i and the projection 8d of the resin frame 8, as shown in FIG. 10. Also when the long section 7b of the backlight FPC 7 curved on the lower side of the reinforcing sheet 29 is displaced to return to the original position, therefore, the mounting angle of the LEDs 71 can be inhibited from deviation following displacement of the long section 7*b* since the end 7*c* of the backlight FPC 7 is held between the planar portion 9*g* and the projection 8*d* along the overall width.

Also when force resulting from displacement of the long section 7*b* is applied to the planar portion 9*g*, it is possible to inhibit the holding portion 9*b* from deformation by pressing the end 7*c* of the backlight FPC 7 with the planar portion 9*g* and the projection 8*d* along the overall width thereby dispersing and uniformizing the force applied to the planar portion 9*g*. Further, the planar portion 9*g* is improved in mechanical strength due to the folded portion 9*i*, whereby the backlight FPC can be inhibited from deformation. Thus, the LEDs 71 can be arranged on prescribed positions. Consequently, leakage of light from the LEDs 71 can be suppressed so that the LEDs 71 can efficiently supply light, whereby the liquid crystal display panel 3 can ensure stable brightness.

The folded portion 9*i* is formed also on the periphery of the opening 9*j* for outwardly exposing the long section 7*b* of the backlight FPC 7 as shown in FIGS. 8 and 9, whereby the mechanical strength of the opening 9*j* can also be improved.

While the LCD unit 100 employs the liquid crystal display panel 3 in the aforementioned embodiment, the present invention is not restricted to this but is also applicable to a display such as an organic EL display employing another display panel so far as the display comprises a display panel.

While the LCD unit 100 is applied to the portable telephone 200 in the aforementioned embodiment, the present invention is not restricted to this but may alternatively be applied to a digital camera, a PDA (personal digital assistant), a portable game machine or a miniature personal computer or the like. The display may further be arranged in a device other than a portable device.

Figure 11:
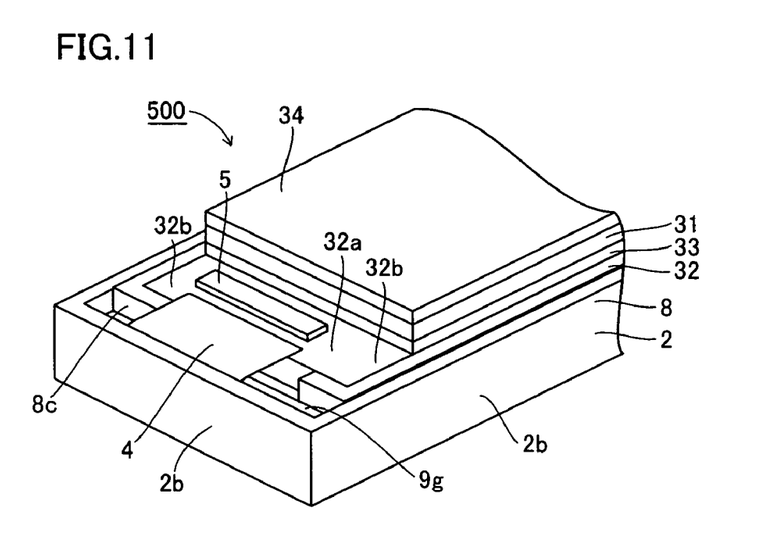
FIG. 11 is a perspective view showing an LCD unit according to a third modification of the LCD unit according to the embodiment shown in FIG. 1.

While the liquid crystal display panel 3 is stored inside the upper and lower frames 1 and 2 in the aforementioned embodiment, the present invention is not restricted to this but only a lower frame 2 may be employed with no upper frame 1, as in a third modification shown in FIG. 11. In this case, the lower frame 2 holds the liquid crystal display panel 3 through the resin frame 8, whereby the components are not separated despite the absence of the upper frame 1. Thus, an LCD unit 500 can be reduced in size and weight due to the omission of the upper frame 1. In this case, the shielding property is reduced due to exposure of the upper side of the liquid crystal display panel 3. When the upper and lower chassis 201 and 202 of the portable telephone 200 are prepared from magnesium, for example, noise or the like can be prevented.

Figure 12:
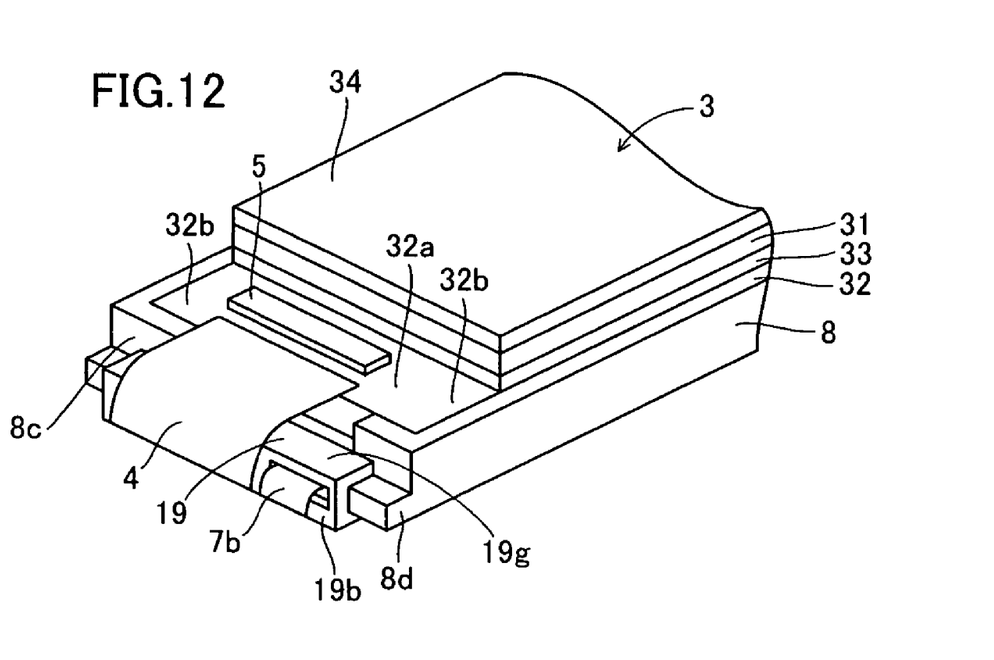
FIG. 12 is a perspective view showing a display panel, a resin frame and a reinforcing sheet of an LCD unit according to a fourth modification of the LCD unit according to the embodiment shown in FIG. 1.

While the holding portion 9*b* of the reinforcing sheet 9 holds the projection 8*d* of the resin frame 8 having the width exceeding the width of the liquid crystal display panel 3 according to the aforementioned embodiment, the present invention is not restricted to this but the width of a holding portion 19*b* of a reinforcing sheet 19 may be smaller than that of the liquid crystal display panel 3, as in a fourth modification shown in FIG. 12. Also in this case, the projection 8*d* of the resin frame 8 is fitted into the U-shaped holding portion 19*b*, so that the reinforcing sheet 19 can hold the resin frame 8.

While the reinforcing sheet 9 is made of metal in the aforementioned embodiment, the present invention is not restricted to this but the reinforcing sheet may alternatively be made of another material such as resin, for example, having equivalent strength.

While the liquid crystal display according to the aforementioned embodiment is provided with four LEDs 71, the present invention is not restricted to this but the display may alternatively be provided with not more than four or at least five LEDs. In this case, the display is preferably provided with at least two LEDs.

While the reinforcing sheet 9 is formed with the projecting portions 9*a* and the panel FPC 4 is formed with the locating holes 46 in order to locate the panel FPC 4 in the aforementioned embodiment, the present invention is not restricted to this but the reinforcing sheet and the panel FPC may alternatively be formed with locating holes and projections engaging with the locating holes respectively, and the projections may be formed by embossing or the like.

While the lower glass substrate 32 is provided with the projection 32*a* and the end of the panel FPC 4 is connected with the projection 32*a* in the aforementioned embodiment, the present invention is not restricted to this but the upper glass substrate 31 may alternatively be provided with a projection so that the end of the panel FPC 4 is connected with this projection.

What is claimed is:

1. A display, comprising:
    a rectangular display panel having a display surface, a back surface opposite to the display surface, and side surfaces around the display panel;
    an upper frame, arranged on the display surface of said display panel, having a first opening for exposing the display surface of said display panel;
    a first wiring board for said display panel having a first end connected to said display panel and a second end;
    a rectangular resin frame for accommodating the display panel, the resin frame having side portions arranged opposite to said side surfaces of the display panel and a bottom portion having an inside surface opposite to the back surface of said display panel and an outside surface opposite to said inside surface;
    a rectangular reinforcing sheet arranged on the outside surface of said resin frame, having a tabular bottom portion overlapping said back surface of said display panel and the outside surface of said resin frame, and side portions arranged opposite to said side portions of said resin frame; and
    a lower frame arranged for engaging with said upper frame to enclose the display panel, the first wiring board, the resin frame, and the reinforcing sheet between the upper frame and the lower frame, the second end of the first wiring board being arranged between the reinforcing sheet and the lower frame, wherein
    said tabular bottom portion of said reinforcing sheet reinforces said back surface of said display panel through said bottom portion of said resin frame, and
    said side portions of said reinforcing sheet are arranged opposite to said side portions of said resin frame so as to reinforce said side surfaces of said display panel through said side portions of said resin frame.

2. The display according to claim 1, wherein said upper frame and said lower frame are made of metal.

3. The display according to claim 1, wherein said reinforcing sheet is made of metal.

4. The display according to claim 1, wherein
    said reinforcing sheet includes a holding portion holding at least one edge of said resin frame.

5. The display according to claim 4, wherein
    said holding portion of said reinforcing sheet is U-shaped, and said U-shaped holding portion holds at least one edge of said resin frame.

6. The display according to claim 4, wherein
said display panel includes two glass substrates,
first said glass substrate has a projection formed to project beyond a region overlapping with second said glass substrate, connected with said first wiring board, and
said holding portion of said reinforcing sheet holds one edge of said resin frame closer to said projection of said first glass substrate.

7. The display according to claim 1, further comprising:
a light source for irradiating light toward said display panel, and
a second wiring board for said light source connected to said light source,
wherein said reinforcing sheet includes a receiving portion receiving said second wiring board.

8. The display according to claim 1, wherein
a connector portion for electrically connecting with an external device is mounted on the surface of said first wiring board closer to said lower frame, and
a second opening is provided in said lower frame on a position corresponding to said connector portion.

9. The display according to claim 1, wherein
a first engaging portion is provided on a surface of the tabular bottom portion of said reinforcing sheet, and
a second engaging portion engaging with said first engaging portion of said reinforcing sheet is provided on said first wiring board.

10. The display according to claim 1, wherein
a third engaging portion is provided on said reinforcing sheet, and
a fourth engaging portion engaging with said third engaging portion is provided on the outside surface of said resin frame.

11. The display according to claim 1, further comprising:
a light source for irradiating light toward said display panel, and
a second wiring board for said light source connected to said light source, wherein
said reinforcing sheet includes:
   a receiving portion receiving said second wiring board, and
   a suppressing portion suppressing displacement when curving said second wiring board.

12. The display according to claim 11, wherein:
said reinforcing sheet includes a holding portion holding at least one edge of said resin frame, and
said holding portion functions also as said suppressing portion.

13. The display according to claim 11, wherein said second wiring board includes a slender long section curved to be connected to said curvedly arranged first wiring board.

14. The display according to claim 13, wherein said resin frame has a groove portion for receiving said long section of said second wiring board.

15. The display according to claim 5, wherein
said U-shaped holding portion of said reinforcing sheet includes a reinforcing portion having a folded forward end on an edge along one edge of said resin frame of said U-shaped holding portion of said reinforcing sheet.

16. The display according to claim 15, further comprising:
a light source for irradiating light toward said display panel, and
a second wiring board for said light source connected to said light source, wherein
a reinforcing portion of said holding portion holds a portion of said second wiring board along said reinforcing portion of said holding portion of said reinforcing sheet.

17. A display comprising:
a rectangular display panel having a display surface, a back surface opposite to the display surface, and side surface around the display panel;
a rectangular resin frame for accommodating the display panel, the resin frame having side portions arranged opposite to said side surfaces of the display panel and a bottom portion having an inside surface opposite to the back surface of the display panel and an outside surface opposite to said inside surface;
a first wiring board for said display panel having a first end connected to said display panel and a second end;
a rectangular reinforcing sheet arranged on the outside surface of said resin frame, having a tabular bottom portion overlapping said back surface of said display panel and the outside surface of said resin frame, and side portions arranged opposite to said side portions of said resin frame; and
a lower frame arranged for engaging with said upper frame to enclose the display panel, the first wiring board, the resin frame, and the reinforcing sheet between the upper frame and the lower frame, the second end of the first wiring board being arranged between the reinforcing sheet and the lower frame, wherein
said tabular bottom portion of said reinforcing sheet reinforces said back surface of said display panel through said bottom portion of said resin frame, and
said side portions of said reinforcing sheet are arranged opposite to said side portions of said resin frame so as to reinforce said side surfaces of said display panel through said side portions of said resin frame.

18. The display according to claim 17, wherein said reinforcing sheet includes a holding portion holding at least one edge of said resin frame.

19. A portable device comprising the display according to claim 1 or 17.

* * * * *